Sept. 23, 1958
N. E. LINDENBLAD
SWITCHING DEVICES
Filed Dec. 28, 1950
2,853,693
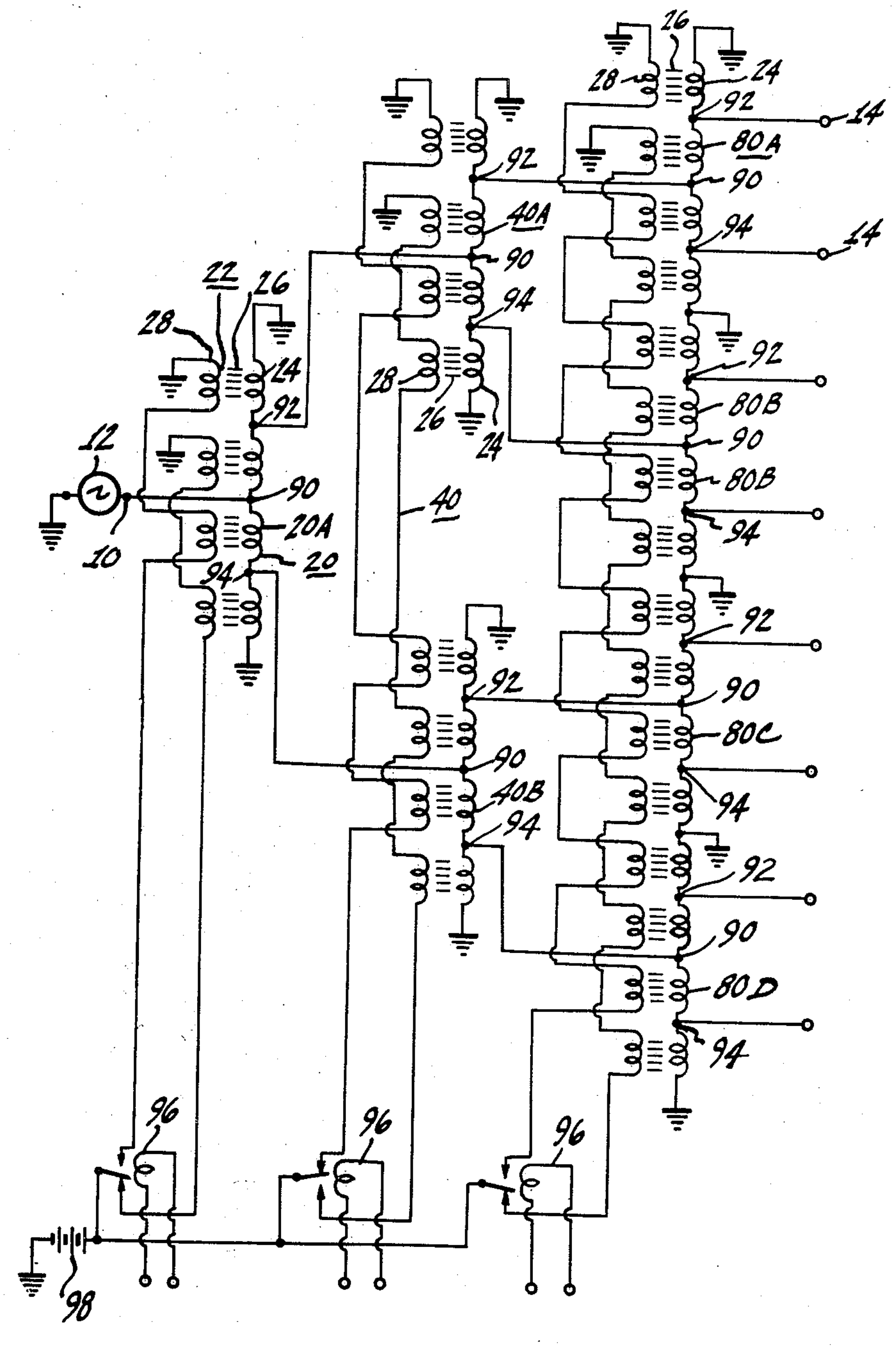
INVENTOR
NILS E. LINDENBLAD
BY Morris L. Rabkin
ATTORNEY United States Patent Office 2,853,693

Patented Sept. 23, 1958

2,853,693

SWITCHING DEVICES

Nils E. Lindenblad, Princeton, N. J., assignor to Radio Corporation of America, a corporation of Delaware Application December 28, 1950, Serial No. 203,093

4 Claims. (Cl. 340—147)

This invention relates generally to electrical switching systems, and more particularly is an improvement in switching systems of the type wherein an input is to be connected to one of a number of outputs.

The usual switching devices such as relays, electron discharge devices or crystal rectifiers all have a limited service life. When installed in apparatus, these devices must be made accessible for continuous inspection and replacement. With small simple equipment, which is always at hand, this is not much of a hardship; but with large complex equipment, or equipment which is located in remote or isolated localities, it becomes important to have as many components which do not require replacement as possible. Furthermore, with the passage of time, electron discharge devices, crystal rectifiers and relays are all subject to changes which may require adjustments or replacement.

It is an object of the present invention to provide an improved and novel electrical switching system which has substantially unlimited life.

It is a further object of the present invention to provide an improved electrical switching system which has substantially constant characteristics.

These and further objects of the present invention are accomplished by providing a switching system wherein four magnetic modulators are interconnected to provide the equivalent of a single-pole, double-throw switch. The magnetic modulator or saturable reactor is employed as a switching device, since its service life is substantially unlimited and its operation is essentially unchanged with time. Although its first cost may be higher and it may occupy more space than the presently used devices, for remote or inaccessible applications these considerations are of no consequence. A further advantage is that the device is essentially shockproof. A switching system to connect an input terminal to one of a number of output terminals is provided by utilizing a plurality of groups of magnetic modulators connected in cascade between the input terminal and the output terminals. The number of the groups is a function of the number of output terminals, and the number of magnetic modulators in each group is a function of the order of the group in the cascade connection. Each group has an integral number of subgroups, each of which consists of the four magnetic modulators connected as above indicated. The direct current windings of the magnetic modulators in each group are connected in alternate series to switching means so that one-half of these alternately connected windings can be excited at a time. The connections between the alternating current windings of all the magnetic modulators in the cascade arrangement are made so that, by excitation of half the direct current windings in each group, a low impedance path is provided between the input terminal and a desired one of the output terminals.

By the term "magnetic modulator" is meant saturable impedances in general, that is, devices consisting essentially of a saturable core, an alternating current winding and a direct current winding for controlling the saturation of the core. In Patent No. 1,794,717 by this applicant, there is shown and described a magnetic modulator suitable for utilization in the embodiment of the invention to be described herein.

The novel features of the invention, as well as the invention itself, both as to its organization and method of operation, will best be understood from the following description when read in connection with the accompanying drawings in which there is shown a circuit diagram of a binary switching system which is an embodiment of the present invention.

Referring now to the drawing, there may be seen a binary switching system employing magnetic modulators. An input terminal 10, to which alternating current excitation 12 is applied, is connected to eight output terminals 14 by three cascade-connected groups of magnetic modulators 20, 40, 80. Each of the magnetic modulators 22 has an alternating current winding 24, a saturable core 26 and a direct current winding 28 for controlling the saturation of the core 26. Each of the groups of magnetic modulators 20, 40, 80 includes a number of subgroups each consisting of four magnetic modulators 22. The action of each of these subgroups is similar to that of a single-pole, double-throw switch.

It will be seen that the first group 20 consists of one subgroup 20A; the second group 40 consists of two subgroups 40A, 40B, and the third group 80 consists of four subgroups 80A, 80B, 80C, 80D. Each subgroup is connected to two subgroups which are in a subsequent group in the cascade connection. In each subgroup the alternating current windings 24 of the four magnetic modulators are connected in series. The connection between the inner two of the series connected windings serves as an input terminal 90, and in the first group 20 an alternating current source 12 is connected to this input terminal 90. The connections between the inner two and outer two of the series conected windings serve as output terminals 92, 94. Connection between groups is made from the two output terminals 92, 94 of a subgroup to the input terminals 90, 90 of two subgroups. The eight output terminals 92, 94 of the third group 80 are all connected to the output terminals 14 of the binary switching system. The free ends of the first and fourth, or outer two, of the series connected alternating current windings 24 of all the subgroups are all connected to ground and act as a common input-output terminal.

Alternate ones of the direct current windings 28 of all the magnetic modulators in each group are connected in series as one series combination. The remaining direct current windings 28 are connected in series as a second combination. A single-pole, double-throw relay 96 is provided for each group 20, 40, 80, and the polarity of the excitation applied to the coils of each of these relays 96 determines which of the two series combinations in each group is excited by the D. C. source 98 which is connected thereto by the relay contacts. As is well-known, applying a direct current to the D. C. winding of a magnetic modulator changes the impedance of the alternating current winding from a high value to a very low value.

In operation, by proper excitation of the three relays for the selection of a series combination in each group to which direct current is applied, a low impedance path is presented between the input terminal and a desired one of the output terminals. A high impedance path is presented between the input terminal and all the other output terminals. In the position to which the relays 96 are shown operated, there is a low impedance path between the input terminal and the third output terminal 14 from the top, as shown in the drawing. In the binary system, shown in the drawing, the magnetic modulators replace seven conventional-type single-pole, double-throw relays. These magnetic modulators have substantially unlimited life and unvarying operational characteristics.

The switching system may be extended to provide for control of as many output terminals as desired. If $2^n$ output terminals are required, where $n$ is any number greater than one, there will be $n$ groups of magnetic modulators with 2 ($2^k$) magnetic modulators in each group, where $k$ is the order of the group in the cascade connection. Switching systems other than binary may be built up using the single-pole, double-throw relay equivalent provided by the four interconnected magnetic modulators.

From the foregoing description, it will be readily apparent that there has been provided a novel and improved switching system which has a substantially unlimited life and unvarying characteristics of operation. Once installed the switching system shown in the embodiment of my invention need never be inspected or replaced when properly used. Although a single embodiment of the present invention has been shown and described, it should be apparent that many changes may be made in the particular embodiment herein disclosed and that many other embodiments are possible, all within the spirit and scope of the invention. It is, therefore, desired that the foregoing description shall be taken as illustrative and not as limiting.

What is claimed is:

1. A switching system for selectively connecting an input terminal to one of a number of output terminals comprising a plurality of groups of magnetic modulators, each of the magnetic modulators having a saturable core, an alternating current winding and a direct current winding for controlling the saturation of said core, the alternating current windings of said groups of magnetic modulators being connected in cascade between said input terminal and said output terminals, the number of said groups being a function of the number of said output terminals, the number of said magnetic modulators in each group being a function of the order of the group in said cascade connection, all of said groups having subgroups all of which have the same number of magnetic modulators, the alternating current windings of the magnetic modulators in each of said subgroups being connected in series and having the center and outside ends of said series connected windings connected to receive an input from the alternating current windings of a subgroup in a previous group in said cascade connected array, and means including said direct current windings to lower the impedance of selected ones of the magnetic modulator alternating current windings in all the groups to provide a low impedance path between said input terminal and a desired one of said output terminals.

2. A switching system as recited in claim 1 wherein the magnetic modulators in each of said groups have alternate ones of their direct current windings connected in series as one series combination and the remaining ones of said direct current windings connected in series as another series combination, and said means to lower the impedance of selected ones of the magnetic modulator windings in all of the groups consists of a source of direct current and switch means for each of said groups to connect said direct current to a desired one of said direct current winding series combinations in each one of said groups.

3. A switching system for selectively connecting an input terminal to one of $2^n$ output terminals, comprising $n$ groups of magnetic modulators connected in cascade, each group having 2($2^k$) magnetic modulators where $k$ is the order from 1 to $n$ of said group in said cascade connection, each of said magnetic modulators including a saturable core, an alternating current winding and a direct current winding for controlling the saturation of said core, the magnetic modulators in each of said groups having their alternating current windings divided into subgroups of four and connected in series, the connection between a first and second and the connection between a third and four of the series connected alternating current windings in a subgroup serving as output terminals, the connection between the second and third alternating current windings in a subgroup serving as an input terminal, the two output terminals of a subgroup being connected to the two input terminals of two subgroups in a subsequent group, the free ends of all the first and fourth alternating current windings being connected together to serve as a common terminal, the magnetic modulators in each of said groups having alternate ones of their direct current windings connected in series as one series combination, the remaining ones of said direct current windings being connected in series as another series combination, and a means to excite one of said series combinations in each group to provide a low impedance path between the input terminal of the first group and a desired one of the $2^n$ output terminals of the $n$th group and a high impedance path to the remaining ones of said $2^n$ output terminals.

4. A single-pole, double-throw switching circuit for an alternating current comprising four magnetic modulators each having a saturable core, an alternating current winding and a direct current winding for controlling the saturation of said core, said four magnetic modulator alternating current windings being connected in series, means to connect said alternating current source to the connection between the inner two of said four series connected alternating current windings the connections between the inner and outer two of said four series connected alternating current windings serving as output connections, said outer ends of said outer two alternating current windings serving as a common input-output connection, alternate ones of said four magnetic modulator direct current windings being connected in series as one series combination, the remaining ones of said direct current windings being connected in series as another series combination, and means to excite one of said series combinations to provide a low impedance path between said connection between the inner two of said alternating current windings and a desired one of the connections between the inner and outer two of said four series connected alternating current windings.

References Cited in the file of this patent

UNITED STATES PATENTS

| | | |
|---|---|---|
| Re. 22,768 | Lamm | June 25, 1946 |
| 1,962,335 | Wensley | June 12, 1934 |
| 2,021,099 | Fitz Gerald | Nov. 12, 1935 |
| 2,027,311 | Fitzgerald | Jan. 7, 1936 |
| 2,129,920 | Fitz Gerald | Sept. 13, 1938 |
| 2,475,575 | Tweedy | July 5, 1949 |
| 2,509,738 | Lord | May 30, 1950 |
| 2,518,022 | Keister | Aug. 8, 1950 |
| 2,524,154 | Wood | Oct. 3, 1950 |
| 2,570,716 | Rochester | Oct. 9, 1951 |

OTHER REFERENCES

Ser. No. 239,432, Koppelmann (A. P. C.), published May 18, 1943.